(12) United States Patent
Peng et al.

(10) Patent No.: US 8,746,946 B2
(45) Date of Patent: Jun. 10, 2014

(54) BACKLIGHT MODULE

(75) Inventors: Ci-Guang Peng, Chiayi (TW);
Cheng-Yu Wang, Taipei (TW);
Chung-Yang Hung, Taoyuan County (TW); Te-Hen Lo, New Taipei (TW);
Cheng-Min Tsai, Hsinchu (TW);
Ming-Sheng Lai, Taipei (TW); Ren-Wei Huang, Hsinchu County (TW);
Shu-Ting Jhuang, Taoyuan County (TW)

(73) Assignee: Au Optronics Corporation, Hsinchu (TW)

( * ) Notice: Subject to any disclaimer, the term of this patent is extended or adjusted under 35 U.S.C. 154(b) by 235 days.

(21) Appl. No.: 13/471,435

(22) Filed: May 14, 2012

(65) Prior Publication Data
US 2013/0163279 A1     Jun. 27, 2013

(30) Foreign Application Priority Data

Dec. 21, 2011 (TW) ............................ 100147746 A

(51) Int. Cl.
*F21V 7/04* (2006.01)
*F21V 8/00* (2006.01)

(52) U.S. Cl.
CPC ............... *F21V 7/04* (2013.01); *G02B 6/0011* (2013.01)
USPC .......................................... 362/609; 362/612

(58) Field of Classification Search
CPC ................................. F21V 7/04; G02B 6/0011
USPC .................................. 362/608, 609, 612, 628
See application file for complete search history.

(56) References Cited

U.S. PATENT DOCUMENTS

| | | | |
|---|---|---|---|
| 6,814,457 B2 * | 11/2004 | Chang et al. | 362/612 |
| 7,484,875 B2 | 2/2009 | Kim et al. | |
| 7,708,443 B2 | 5/2010 | Kim et al. | |
| 8,057,086 B2 | 11/2011 | Kim et al. | |
| 8,446,545 B2 * | 5/2013 | Kwon et al. | 362/612 |
| 2002/0044234 A1 | 4/2002 | Choi | |
| 2007/0091640 A1 | 4/2007 | Kim et al. | |

(Continued)

FOREIGN PATENT DOCUMENTS

| | | |
|---|---|---|
| CN | 1952704 | 4/2007 |
| CN | 101135809 | 3/2008 |

(Continued)

OTHER PUBLICATIONS

"First Office Action of China Counterpart Application", issued on May 30, 2013, p. 1-p. 5.

*Primary Examiner* — David V Bruce
(74) *Attorney, Agent, or Firm* — Jianq Chyun IP Office

(57) ABSTRACT

A backlight module including a light guide plate and a light source is provided. The light guide plate has a light incident surface, a light reflection surface, a first side surface and a second side surface. The light incident surface is connected to the second side surface. The reflection surface is connected between the first side surface and the light incident surface. The first and the second side surfaces are two planes with their extending planes intersected. The light incident surface is a chamfering plane connected between the first and the second side surfaces. The light reflection surface is a cambered surface connected between the first side surface and the light incident surface. The light source is disposed next to the light incident surface, so as to transmit light into the light guide plate through the light incident surface.

19 Claims, 2 Drawing Sheets

(56) References Cited

U.S. PATENT DOCUMENTS

| | | |
|---|---|---|
| 2008/0123368 A1 | 5/2008 | Fujino et al. |
| 2009/0103326 A1 | 4/2009 | Kim et al. |
| 2010/0172155 A1 | 7/2010 | Kim et al. |
| 2013/0128619 A1* | 5/2013 | Wang et al. .................. 362/613 |

FOREIGN PATENT DOCUMENTS

| | | |
|---|---|---|
| JP | 2006-209076 | 8/2006 |
| TW | 200533865 | 10/2005 |
| TW | I299423 | 8/2008 |

* cited by examiner

BACKLIGHT MODULE

CROSS-REFERENCE TO RELATED APPLICATION

This application claims the priority benefit of Taiwan application serial no. 100147746, filed on Dec. 21, 2011. The entirety of the above-mentioned patent application is hereby incorporated by reference herein and made a part of this specification.

BACKGROUND OF THE INVENTION

1. Field of the Invention

The present invention relates to a backlight module, and in particular, to a backlight module using a light-emitting diode (LED) as a light source.

2. Description of Related Art

A Liquid Crystal Display (LCD) has advantages of operating under a low voltage, no radiant rays, a light weight and a small size, which a display manufactured by using a conventional Cathode Ray Tube (CRT) does not possess. The LCD has become a main subject of the display study in recent years. Since the LCD is not a self-luminous display, display functions of the LCD are achieved when required light is provided by a backlight module. In recent years, with the improvement of environment protection, a light-emitting element used in the backlight module is transformed from Cold Cathode Fluorescent Lamp (CCFL) to light-emitting diode (LED).

When the LED is applied in the backlight module, e.g., an edge-type backlight module, the LED is usually disposed at a long edge or a short edge of a light guide plate. However, since the products develop towards a trend of being light and thin and lowering the manufacturing cost, the manufacturers manage to use fewer LEDs to achieve the same effect, and the LED is usually disposed at a corner of the light guide plate.

However, the luminance of the LED disposed at a corner of the light guide plate can be achieved only by using the LED with high power. In addition, the LED with high power means that the LED is of a large size to overcome the heat dissipation problem thereof, but the LED in large size is difficult to be disposed at the corner of the light guide plate, thus conflicting with the trend of a light and thin product.

SUMMARY OF THE INVENTION

Accordingly, the present invention is directed to a backlight module, which has a desirable optical transmission efficiency and uniformity.

An embodiment of the present invention provides a backlight module, which includes a light guide plate and a light source. The light guide plate has a light incident surface, a light reflection surface, a first side surface, and a second side surface. The light incident surface is connected to the second side surface. The light reflection surface is connected between the first side surface and the light incident surface. The first side surface and the second side surface are two planes with their extending planes intersected. The light incident surface is a chamfering plane connected between the first side surface and the second side surface. The light reflection surface is a cambered surface connected between the first side surface and the light incident surface. The light source is disposed next to the light incident surface, so as to transmit light into the light guide plate through the light incident surface.

An embodiment of the present invention provides a backlight module, which includes a light guide plate and a light source. The light guide plate has a light incident surface, a first side surface, and a second side surface. The light incident surface and the first side surface have a fillet therebetween. The light incident surface and the second side surface have an obtuse angle therebetween.

In an embodiment of the present invention, the included angle of the first and the second side surfaces is less than 90°.

In an embodiment of the present invention, the light guide plate has a top surface, connected to the light incident surface, the light reflection surface, the first side surface, and the second side surface. The light of the light source emits out of the light guide plate from a display region of the top surface.

In an embodiment of the present invention, the display region has a first side edge and a second side edge that intersect with each other. The first side edge corresponds to the first side surface. The second side edge corresponds to the second side surface. A center of the second side edge keeps a first distance (D1) from the second side surface.

In an embodiment of the present invention, the extending planes of the light incident surface and the second side surface have a first angle ($\theta 1$). An orthogonal projection of a joint of the light incident surface and the second side surface on the top surface keeps a second distance (D2) from an orthogonal projection of a center of the second side edge on the second side surface. A second angle ($\theta 2$) is defined by the first distance (D1) and the second distance (D2). $\theta 2 = \arctan(D2/D1)$, and $\theta 1 = 90° - \theta_L - \theta 2$, where $\theta_L$ is a light-emitting angle of the light source in the light guide plate.

In an embodiment of the present invention, the light source is an LED, and $\theta_L$ is 42°.

In an embodiment of the present invention, the backlight module has a thickness (H1). A user views the second side edge in a viewing angle ($\theta 3$) to define that $D1 = H1 \cdot \tan(\theta 3)$.

In an embodiment of the present invention, the viewing angle ($\theta 3$) is greater than or equal to 45°, so that the first distance is greater than or equal to the thickness of the backlight module.

In an embodiment of the present invention, a center of curvature of the cambered surface is located on the first side edge or an extending line thereof.

In an embodiment of the present invention, when the backlight module uses a non-ten-inch light guide plate, a radius of curvature of the cambered surface is R. $R = 3.34 - D4(D1-6.5)/(D2-107.35)$, where D1 is the first distance of the non-ten-inch light guide plate, D2 is the second distance of the non-ten-inch light guide plate, D4 is a fourth distance of the orthogonal projection of the light incident surface on the top surface of the non-ten-inch light guide plate.

In an embodiment of the present invention, a center of curvature of the cambered surface is located at a joint of the first side edge and the second side edge.

In an embodiment of the present invention, the obtuse angle $= 90° + \theta_L + \theta 2$, where $\theta 2 = \arctan(D2/D1)$ and $\theta_L$ is a light-emitting angle of the light source in the light guide plate.

In an embodiment of the present invention, the fillet is a bullnose. A center of the bullnose is located within the display region.

To sum up, in the aforementioned embodiments of the present invention, in the backlight module, a chamfering plane is disposed between the first side surface and the second side surface of the light guide plate as the light incident surface of the LED. A cambered surface is disposed between the first side surface and the light incident surface as the light reflection surface. In this way, after the light of the light source is transmitted into the light guide plate through the light incident surface, the efficiency and uniformity of the light transmitted out of the light guide plate is increased through the cambered light reflection surface.

In order to make the aforementioned features and advantages of the present invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
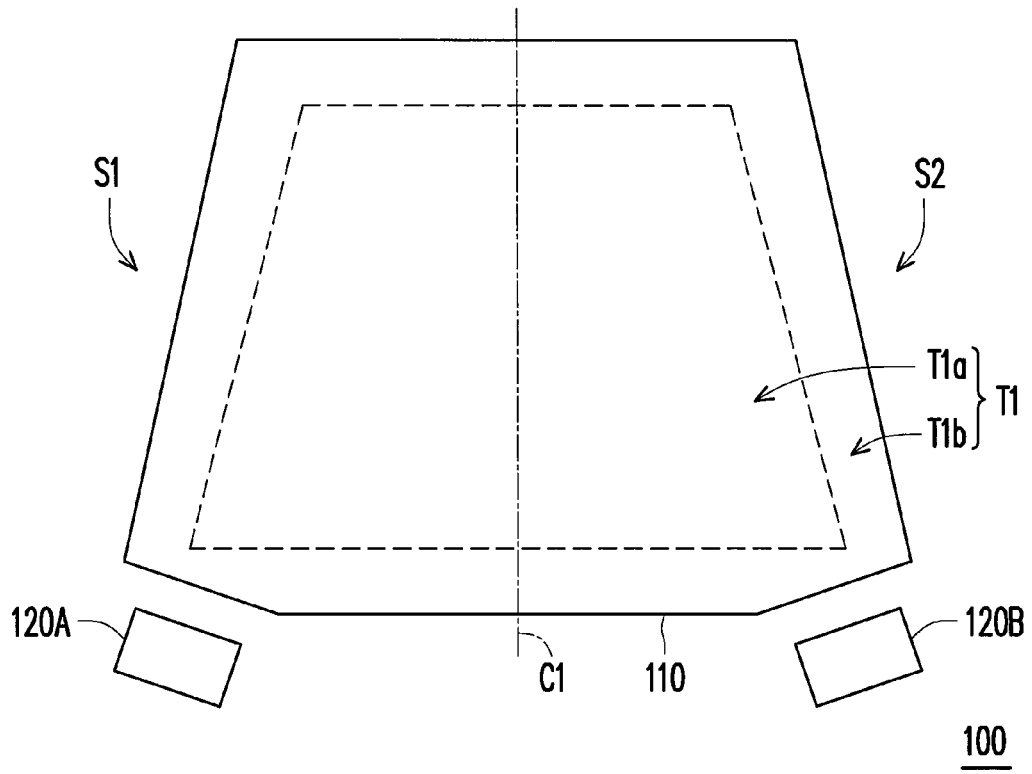
FIG. 1 is a top view of a backlight module according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 2:
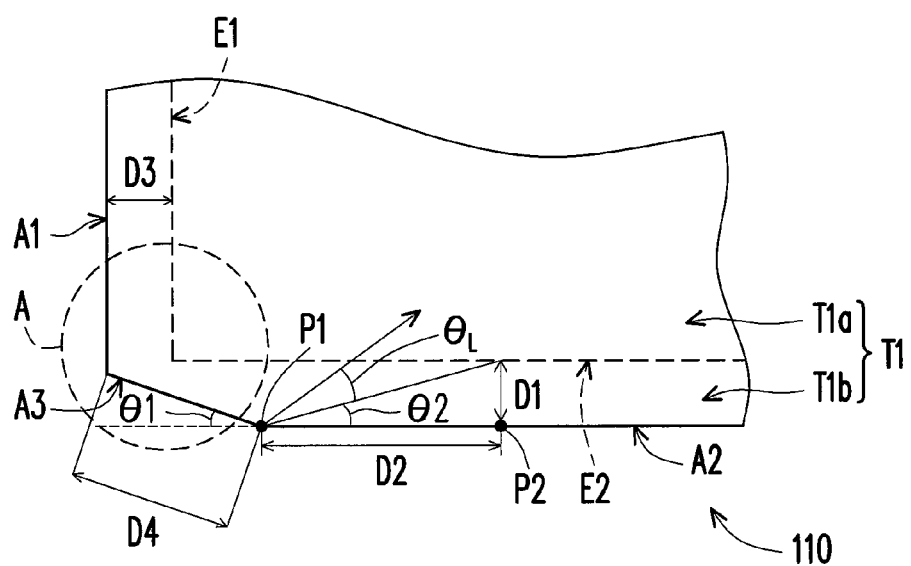
FIG. 2 is a partial amplified view of the backlight module of FIG. 1.
Figure 3:
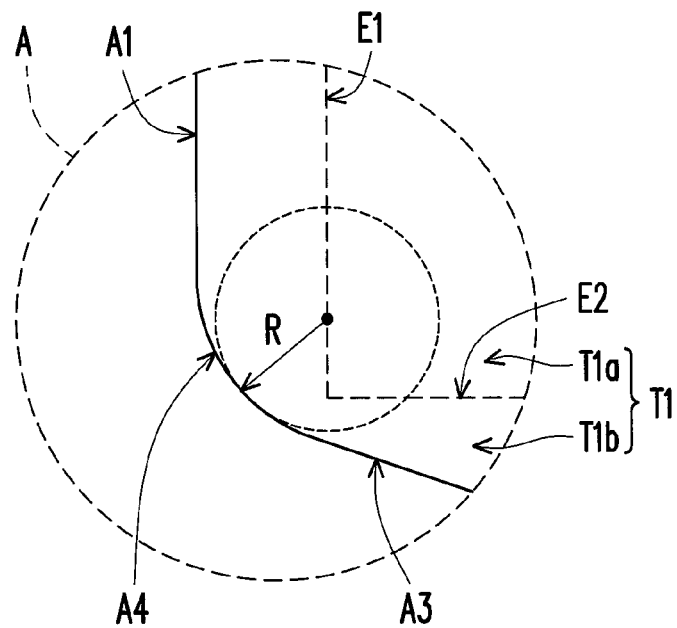
FIG. 3 is a partial amplified view of the backlight module of FIG. 2.

FIG. 1 is a top view of a backlight module according to an embodiment of the present invention. FIG. 2 is a partial amplified view of the backlight module of FIG. 1, so as to illustrate a size of each part of a light guide plate. FIG. 3 is a partial amplified view of the backlight module of FIG. 2. Referring to FIG. 1 to FIG. 3, in this embodiment, a backlight module 100 is an edge-type backlight module, and includes a light guide plate 110 and two light sources 120A and 120B. As shown in FIG. 1, the light guide plate 110 is in a trapezoid-like shape with the lower portion wider than the upper portion, and is disposed symmetrically along a central axis C1, so that the light guide plate 110 is divided into a first side Si and a second side S2 with reference to the central axis C1. The two light sources 120A and 120B are two LEDs respectively located at two corners of the first side Si and the second side S2 of the light guide plate 110. In this way, in this embodiment, a structure of the first side Si and the light source 120A located at the first side Si of the light guide plate 110 are merely described first.

The light guide plate 110 has a light incident surface A3, a light reflection surface A4, a first side surface A1, and a second side surface A2. The light incident surface A3 is connected to the second side surface A2. The light reflection surface A4 is connected between the first side surface A1 and the light incident surface A3. The light source 120A is disposed next to the light incident surface A3, so as to transmit light into the light guide plate 110 through the light incident surface A3.

In addition, the first side surface A1 and the second side surface A2 are two planes with their extending planes intersected. It should be noted that, in this embodiment, a refractive index of the light guide plate 110 is 1.5. A light-emitting angle of the light source 120A (an LED) is 180°. In this way, the light-emitting angle of the light transmitted into the light guide plate 110 is 42°. In addition, since an included angle of the first side surface A1 and the second side surface A2 of the light guide plate 110 of this embodiment is less than 90°, the trapezoid-like shape with the lower portion wider than the upper portion of the light guide plate 110 is formed. Subsequently, the light sources 120A and 120b are disposed on a side of the wide lower portion, so that the light guide plate 110 has a desirable optical transmission efficiency.

Additionally, the light incident surface A3 is a chamfering plane connected between the first side surface A1 and the second side surface A2. Namely, the light incident surface A3 and the second side surface A2 have an obtuse angle therebetween. The light reflection surface A4 is a cambered surface connected between the first side surface A1 and the light incident surface A3. Namely, the light incident surface A3 and the first side surface A1 have a fillet therebetween. After the light source 120B located on the second side S2 transmits light into the light guide plate 110, the light on the first side S1 is influenced by the light reflection surface A4, and then is reflected back to the light guide plate 110, thereby avoiding mura effect on the first side S1 of the light guide plate 110. Namely, by using the light reflection surface A4, the light-emitting efficiency of the light guide plate 110 is increased at the first side S1. Likewise, for the light that is transmitted by the light source 120A on the first side S1 into the light guide plate 110, the light uniformity and light-emitting efficiency of the light guide plate 110 at the second side S2 are increased due to the same structure of the light reflection surface A4. Here, according to the disposition of the light guide plate 110 and the light sources 120A and 120B, a user may increase the light uniformity and the light-emitting efficiency on the first side S1 or the second side S2 of the light guide plate 110 through the structure of the light reflection surface A4.

The relative relation of each structure of the light guide plate 110 is further described below.

Referring to FIG. 2 and FIG. 3, in this embodiment, the light guide plate 110 further has a top surface T1. The top surface T1 is connected to the light incident surface A3, the light reflection surface A4, the first side surface A1, and the second side surface A2. The top surface T1 is divided into a display region T1a and a peripheral region T1b surrounding the display region T1a. The light transmitted into the light guide plate 110 is transmitted out of the light guide plate 110 from the display region T1a.

The display region T1a has a first side edge E1 and a second side edge E2 that intersect with each other. The first side edge E1 corresponds to the first side surface A1. The second side edge E2 corresponds to the second side surface A2. A center of curvature of the light reflection surface A4 (a cambered surface) is located on the first side edge, and preferably located at a joint of the first side edge E1 and the second side edge E2.

Additionally, in another embodiment of the present invention which is not shown herein, the light reflection surface A4 (a cambered surface) is a bullnose. A center of the bullnose is located within the display region T1a, so that the light can be transmitted back to the display region T1a.

In addition, a center of the second side edge E2 keeps a first distance D1 from the second side surface A2. In addition, the extending planes of the light incident surface A3 and the second side surface A2 have a first angle $\theta 1$. An orthogonal projection (a projection point P1) of the joint (namely, an intersection line of the light incident surface A3 and the second side surface A2) of the light incident surface A3 and the second side surface A2 on the top surface T1 keeps a second distance D2 from an orthogonal projection (a projection point P2) of the center of the second side edge E2 on the second side surface A2. In this way, a second angle $\theta 2$ is defined by the first distance D1 and the second distance D2, where $\theta 2 = \arctan(D2/D1)$.

Subsequently, based on a geometrical optics relation of the light transmitted by the light source 120A into the light guide plate 110 through the light incident surface A3, it can be known that $\theta1+\theta_L+\theta2=90°$, where $\theta_L$ is a light-emitting angle of the light after entering the light guide plate 110. In other words, in this embodiment, $\theta_L$ is 42°. In this way, it can be further known that $\theta1=90°-\theta_L-\theta2$. Namely, a chamfering angle degree of the light incident surface A3 (a chamfering plane) can be preliminarily designed for the light source 120A (or 120B). In other words, the obtuse angle between the light incident surface A3 and the second side surface A2 is $\theta°+\theta_L+\theta2$.

For example, when the backlight module 100 uses a ten-inch light guide plate, the first distance D1 is 6.5 mm and the second distance D2 is 107.35 mm. Therefore, it can be obtained in a sequence that the second angle $\theta2$ is 3.47°, and further the first angle $\theta1$ is calculated, namely 44.53°.

Figure 4:
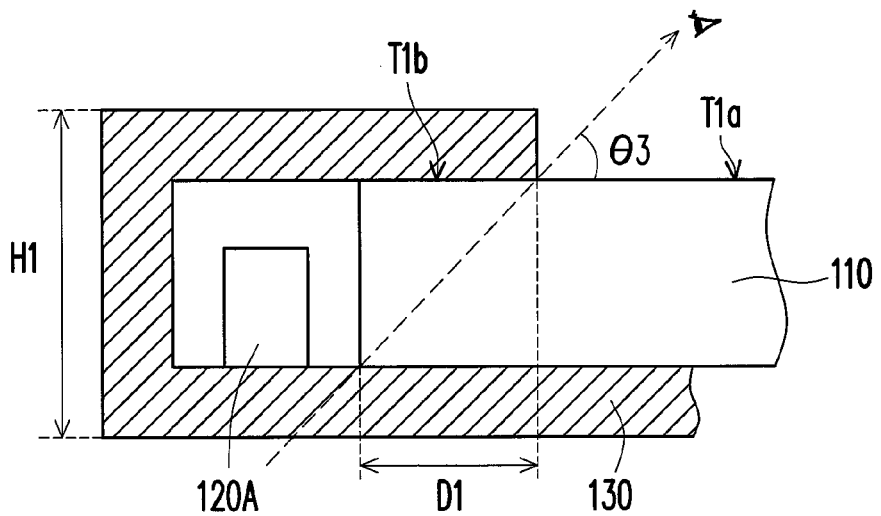
FIG. 4 is a partial sectional view of the backlight module of FIG. 1.

FIG. 4 is a partial sectional view of the backlight module of FIG. 1. Referring to FIG. 2 to FIG. 4, it should be further noted that, in the backlight module 100, the light guide plate 110 and the light source 120A are disposed within one frame 130 and the backlight module 100 has a thickness H1. Additionally, in order to avoid a light leakage phenomenon when a user views the display region T1a in a viewing angle $\theta3$, the aforementioned first distance D1 may be further defined that D1=H1*tan($\theta3$). Generally speaking, the viewing angle $\theta3$ for viewing the backlight module 100 by the user is greater than or equal to 45°. Accordingly, the corresponding first distance D1 is necessarily greater than or equal to H1, so that it is difficult for the user to observe the mura effect of the backlight module 100. For example, when the thickness H1 of the backlight mode 100 using the ten-inch light guide plate is 2.63 mm, the first distance D1 is necessarily greater than or equal to 2.63 mm. However, in order to ensure that the mura effect cannot be observed by a user when the user views in a larger viewing angle, the first distance D1 provided by this embodiment is 6.5 mm.

Referring to FIG. 2 and FIG. 3 again, for a designer, after the light incident surface A3 (a chamfering plane) is defined, the designer needs to further define a correlation property of the light reflection surface A4. In this embodiment, firstly, a third distance D3 from the first side edge E1 to the first side surface A1 is defined. The orthogonal projection of the light incident surface A3 on the top surface T1 is a line segment having a fourth distance D4.

It should be noted that, the fourth distance D4 is determined according to the specification of the light source 120A. Namely, the fourth distance D4 varies with different sizes of the LED in this embodiment. Here, for ease of description of the size relation of the light guide plate 110, the same LEDs are used as the light source 120A. Therefore, the light-emitting angle $\theta_L$ is fixed at 42° and the fourth distance D4 is fixed at 8 mm.

In this way, when the backlight module 100 uses a ten-inch light guide plate, the first distance D1 is 6.5 mm, the second distance D2 is 107.35 mm, and the radius of curvature R of the cambered surface (the light reflection surface A4) is D3, namely 3.34 mm.

Additionally, with the change of the size of the light guide plate 110, the aforementioned related sizes change accordingly. When the backlight module 100 uses a non-ten-inch light guide plate, the radius of curvature of the cambered surface (the light reflection surface A4) is R=D3−D4*$\Delta\theta2$, where D3 is the third distance D3 when the backlight module 100 uses the ten-inch light guide plate. The first distance D1 and the second distance D2 thereof also correspondingly changes with the different sizes designed for the light guide plate. Here, the variable quantities are defined to be $\Delta$D1 and $\Delta$D2. Therefore, it is defined that, $\Delta\theta2=\Delta$D1/$\Delta$D2. Take a 15.6-inch light guide plate for example. The first distance D1 is 7.2 mm., and the second distance D2 is 179.65 mm. The first distance and the second distance of the original ten-inch light guide plate are described above. Therefore, $\Delta$D1 is 0.7 mm and $\Delta$D2 is 72.3 mm. Hence, the aforementioned formula is R=3.34−D4(D1−6.5)/(D2−107.35)and then the radius of curvature of the cambered surface (the light reflection surface A4) can be obtained through the formula, namely R=3.26 mm.

To sum up, in the embodiments of the present invention, in the light guide plate, the chamfering plane (the light incident surface A3) is disposed on at least one side (for example, the first side Si or the second side S2) of the light guide plate. The first side surface and the second side surface present a shape with the lower portion wider than the upper portion and the included angle thereof is less than 90°. Therefore, the light transmitted by the light source can have a desirable utilization ratio. Namely, a capturing capacity of the light guide plate for the light transmitted by the LED is enhanced.

In addition, by using the cambered light reflection surface between the chamfering plane and the first side surface, the light at the second side is prevented from leaking from the first side due to the light reflection surface after entering the light guide plate. Namely, the light utilization ratio of the light guide plate at the first side is increased, and the light can have a desirable light uniformity at the first side of the light guide plate.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A backlight module, comprising:
a light guide plate, having a light incident surface, a light reflection surface, a first side surface, and a second side surface, wherein the light incident surface is connected to the second side surface, the light reflection surface is connected between the first side surface and the light incident surface, the first side surface and the second side surface are two planes with their extending planes intersected, the light incident surface is a chamfering plane connected between the first side surface and the second side surface, and the light reflection surface is a cambered surface connected between the first side surface and the light incident surface; and
a light source, disposed next to the light incident surface, so as to transmit light into the light guide plate through the light incident surface.

2. The backlight module according to claim 1, wherein the included angle of the first and the second side surfaces is less than 90°.

3. The backlight module according to claim 1, wherein the light guide plate has a top surface, connected to the light incident surface, the light reflection surface, the first side surface, and the second side surface; the light of the light source transmits out of the light guide plate through a display region of the top surface.

4. The backlight module according to claim 3, wherein the display region has a first side edge and a second side edge that intersect with each other; the first side edge corresponds to the first side surface; the second side edge corresponds to the second side surface; and a center of the second side edge keeps a first distance (D1) from the second side surface.

5. The backlight module according to claim 4, wherein the extending planes of the light incident surface and the second side surface have a first angle ($\theta 1$); an orthogonal projection of a joint of the light incident surface and the second side surface on the top surface keeps a second distance (D2) from an orthogonal projection of the center of the second side edge on the second side surface; a second angle ($\theta 2$) is defined by the first distance (D1) and the second distance (D2), $\theta 2 = \arctan(D2/D1)$ and $\theta 1 = 90° - \theta_L - \theta 2$, and $\theta_L$ is a light-emitting angle of the light source in the light guide plate.

6. The backlight module according to claim 5, wherein the light source is a light-emitting diode (LED) and $\theta_L$ is 42°.

7. The backlight module according to claim 4, wherein the backlight module has a thickness (H1), and a user views the second side edge in a viewing angle ($\theta 3$) to define that the first distance (D1)=H1*tan($\theta 3$).

8. The backlight module according to claim 7, wherein the viewing angle is greater than or equal to 45°, so that the first distance is greater than or equal to the thickness of the backlight module.

9. The backlight module according to claim 5, wherein a center of curvature of the cambered surface is located on the first side edge or an extending line thereof.

10. The backlight module according to claim 5, wherein when the backlight module uses a non-ten-inch light guide plate, a radius of curvature of the cambered surface is R, R=3.34−D4*(D1−6.5)/(D2−107.35), D1 is the first distance of the non-ten-inch light guide plate, D2 is the second distance of the non-ten-inch light guide plate, D4 is a fourth distance of the orthogonal projection of the light incident surface on the top surface of the non-ten-inch light guide plate.

11. The backlight module according to claim 9, wherein the center of curvature of the cambered surface is located at a joint of the first side edge and the second side edge.

12. A backlight module, comprising:
 a light guide plate, having a light incident surface, a first side surface, and a second side surface, wherein the light incident surface and the first side surface have a fillet therebetween, and the light incident surface and the second side surface have an obtuse angle therebetween; and
 a light source, disposed corresponding to the light incident surface.

13. The backlight module according to claim 12, wherein the included angle of the first and the second side surfaces is less than 90°.

14. The backlight module according to claim 12, wherein the light guide plate has a top surface, connected to the light incident surface, the first side surface, and the second side surface; the light of the light source transmits out of the light guide plate through a display region of the top surface.

15. The backlight module according to claim 14, wherein the display region has a first side edge and a second side edge that intersect with each other; the first side edge corresponds to the first side surface; the second side edge corresponds to the second side surface; a center of the second side edge keeps a first distance (D1) from the second side surface; an angularity portion of the obtuse angle keeps a second distance (D2) from the orthogonal projection of the center of the second side edge on the second side surface; and the obtuse angle=90°+$\theta_L$+$\theta 2$, $\theta 2 = \arctan(D2/D1)$ and $\theta_L$ is a light-emitting angle of the light source in the light guide plate.

16. The backlight module according to claim 15, wherein the light source is a light-emitting diode (LED) and $\theta_L$ is 42°.

17. The backlight module according to claim 15, wherein the backlight module has a thickness (H1), and a user views the second side edge in a viewing angle ($\theta 3$) to define that the first distance (D1)=H1*tan($\theta 3$).

18. The backlight module according to claim 17, wherein the viewing angle is greater than or equal to 45°, so that the first distance is greater than or equal to the thickness of the backlight module.

19. The backlight module according to claim 14, wherein the fillet is a bullnose and a center of the bullnose is located within the display region.

\* \* \* \* \*

UNITED STATES PATENT AND TRADEMARK OFFICE
CERTIFICATE OF CORRECTION

PATENT NO. : 8,746,946 B2  
APPLICATION NO. : 13/471435  
DATED : June 10, 2014  
INVENTOR(S) : Ci-Guang Peng et al.

Page 1 of 1

It is certified that error appears in the above-identified patent and that said Letters Patent is hereby corrected as shown below:

In the Specification

At column 2, line 28; column 2, line 55; column 4, line 67  
change "$\theta 2=\arctan(D2/D1)$" to --$\theta 2=\arctan(D1/D2)$--

At column 2, line 35  
change "to define that $D1=H1*\tan(\theta 3)$" to --to define the first distance (D1), wherein $H1=D1*\tan(\theta 3)$--

At column 5, line 26  
change "$D1=H1*\tan(\theta 3)$" to --$H1=D1*\tan(\theta 3)$--

In the Claims

At column 7, claim 5; claim 15  
"$\theta 2=\arctan(D2/D1)$" to --$\theta 2=\arctan(D1/D2)$--

At column 7, claim 7; claim 17  
change "to define that $D1=H1*\tan(\theta 3)$" to --to define the first distance (D1), wherein $H1=D1*\tan(\theta 3)$--

Signed and Sealed this  
Thirtieth Day of June, 2015

Michelle K. Lee  
*Director of the United States Patent and Trademark Office*